United States Patent
McDonagh et al.

(10) Patent No.: US 11,166,143 B1
(45) Date of Patent: Nov. 2, 2021

(54) TRAFFIC DENSITY MONITORING

(71) Applicant: International Business Machines Corporation, Armonk, NY (US)

(72) Inventors: James McDonagh, Frodsham (GB); Lan Ngoc Hoang, Lymm (GB); Paolo Fraccaro, Warrington (GB); Laura-Jayne Gardiner, Wirral (GB); Peter Yoxall, Goostrey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/163,667

(22) Filed: Feb. 1, 2021

(51) Int. Cl.
*H04W 4/80* (2018.01)
*H04W 16/14* (2009.01)
*H04W 4/029* (2018.01)
*H04W 8/00* (2009.01)
*H04W 84/18* (2009.01)

(52) U.S. Cl.
CPC ............ *H04W 4/80* (2018.02); *H04W 4/029* (2018.02); *H04W 8/005* (2013.01); *H04W 16/14* (2013.01); *H04W 84/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,064,925 | B1* | 11/2011 | Sun ................... | H04W 64/006 455/456.1 |
| 2003/0134648 | A1* | 7/2003 | Reed .................. | H04W 4/029 455/456.1 |
| 2012/0276847 | A1* | 11/2012 | Peterson ............. | G01S 5/0027 455/41.2 |
| 2015/0304815 | A1* | 10/2015 | Ghose ................ | H04W 4/023 455/456.3 |
| 2017/0156124 | A1* | 6/2017 | Ashley, Jr. .......... | G06Q 10/063 |
| 2018/0158322 | A1* | 6/2018 | McDonnell ......... | H04W 4/025 |
| 2018/0160282 | A1* | 6/2018 | van de Poll ......... | H04W 4/029 |
| 2020/0017117 | A1* | 1/2020 | Milton ................ | B60W 50/045 |

FOREIGN PATENT DOCUMENTS

| | | |
|---|---|---|
| IN | 201641024788 A | 1/2018 |
| IN | 202011035808 A | 9/2020 |

OTHER PUBLICATIONS

Kumar, M., "Real-time map of Pedestrian traffic", Feb. 8, 2016, 2 pages <https://geoawesomeness.com/real-time-map-pedestrian-traffic/>.
Admin, "Bluetooth Beacons for Tracking?", Jan. 30, 2017, 4 pages <https://www.accuware.com/blog/bluetooth-beacons-tracking/>.
Unknown, "Bluetooth tracking and COVID-19: A tech primer", Mar. 31, 2020, 5 pages <https://privacyinternationalLorg/explainer/3536/bluetooth-tracking-and-covid-19-tech-primer>.

(Continued)

*Primary Examiner* — David Bilodeau
(74) *Attorney, Agent, or Firm* — James L. Olsen

(57) ABSTRACT

A lead device with positioning capabilities can be initiated. The lead device can poll wireless enabled devices within a wireless range. Device identification information associated with the polled wireless enabled devices can be removed. Density can be calculated within the wireless range based on the number of polled wireless enabled devices within the wireless range.

20 Claims, 8 Drawing Sheets

(56) References Cited

OTHER PUBLICATIONS

Amazon, "Dual XGPS150 Bluetooth GPS Receiver", printed Dec. 15, 2020, 7 pages <https://www.amazon.co.uk/Dual-XGPS150-Bluetooth-GPS-Receiver/dp/B00D84PG5Y>.

Altaweel, M., "Density Mapping With GIS", Oct. 27, 2017, 9 pages <https://www.gislounge.com/density-mapping/>.

Coombs, J., "The Straight Goods on Bluetooth: How Many Consumers Have it on?", Apr. 23, 2015, 3 pages <https://m.rover.io/the-straight-goods-on-bluetooth-how-many-consumers-have-it-on-d0ebe3b5d718>.

Chamberlain, L., "Beacon Roundup: What Percentage of Americans Leave Bluetooth on, Anyway?", Jul. 20, 2016, 5 pages, <https://geomarketing.com/beacon-roundup-what-percentage-of-americans-leave-bluetooth-on-anyway>.

Kaplan, D., "Snapchat Unveils Three New Location Tools for Marketers With Hopper and Nordstrom Rack", Mar. 22, 2018, 6 pages, <https://geomarketing.com/snapchat-unveils-three-new-location-tools-for-marketers-with-hopper-and-nordstrom-rack>.

Unknown, "Using Beacons, iBeacons for Real-time Locating Systems (RTLS)", BeaconZone, printed Dec. 15, 2020, 4 pages, <https://www.beaconzone.co.uk/BeaconForRTLS>.

Lewandowski et al., "Road Traffic Monitoring System Based on Mobile Devices and Bluetooth Low Energy Beacons", Research Article, Wireless Communications and Mobile Computing, vol. 2018, Article ID 3251598, 13 pages, <https://www.hindawi.com/journals/wcmc/2018/3251598/>.

Versichele et al., "Mobile Mapping of Sporting Event Spectators Using Bluetooth Sensors: Tour of Flanders 2011", Published: Oct. 22, 2012, 18 pages, <https://www.ncbi.nlm.nih.gov/pmc/articles/PMC3545615/>.

Weppner et al., "Bluetooth Based Collaborative Crowd Density Estimation with Mobile Phones", Mar. 2013, 8 pages.

Schauer et al., "Estimating Crowd Densities and Pedestrian Flows Using Wi-Fi and Bluetooth", MOBIQUITOUS, Dec. 2-5, 2014, 8 pages.

Mell et al., "The NIST Definition of Cloud Computing", Recommendations of the National Institute of Standards and Technology, Sep. 2011, 7 pages.

\* cited by examiner

TRAFFIC DENSITY MONITORING

BACKGROUND

The present disclosure relates generally to the field of computing, and in particular, to wireless traffic density monitoring.

SUMMARY

Embodiments of the present disclosure include a method, computer program product, and system for traffic density monitoring. A lead device with positioning capabilities can be initiated. The lead device can poll wireless enabled devices within a wireless range. Device identification information associated with the polled wireless enabled devices can be removed. Density can be calculated within the wireless range based on the number of polled wireless enabled devices within the wireless range.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
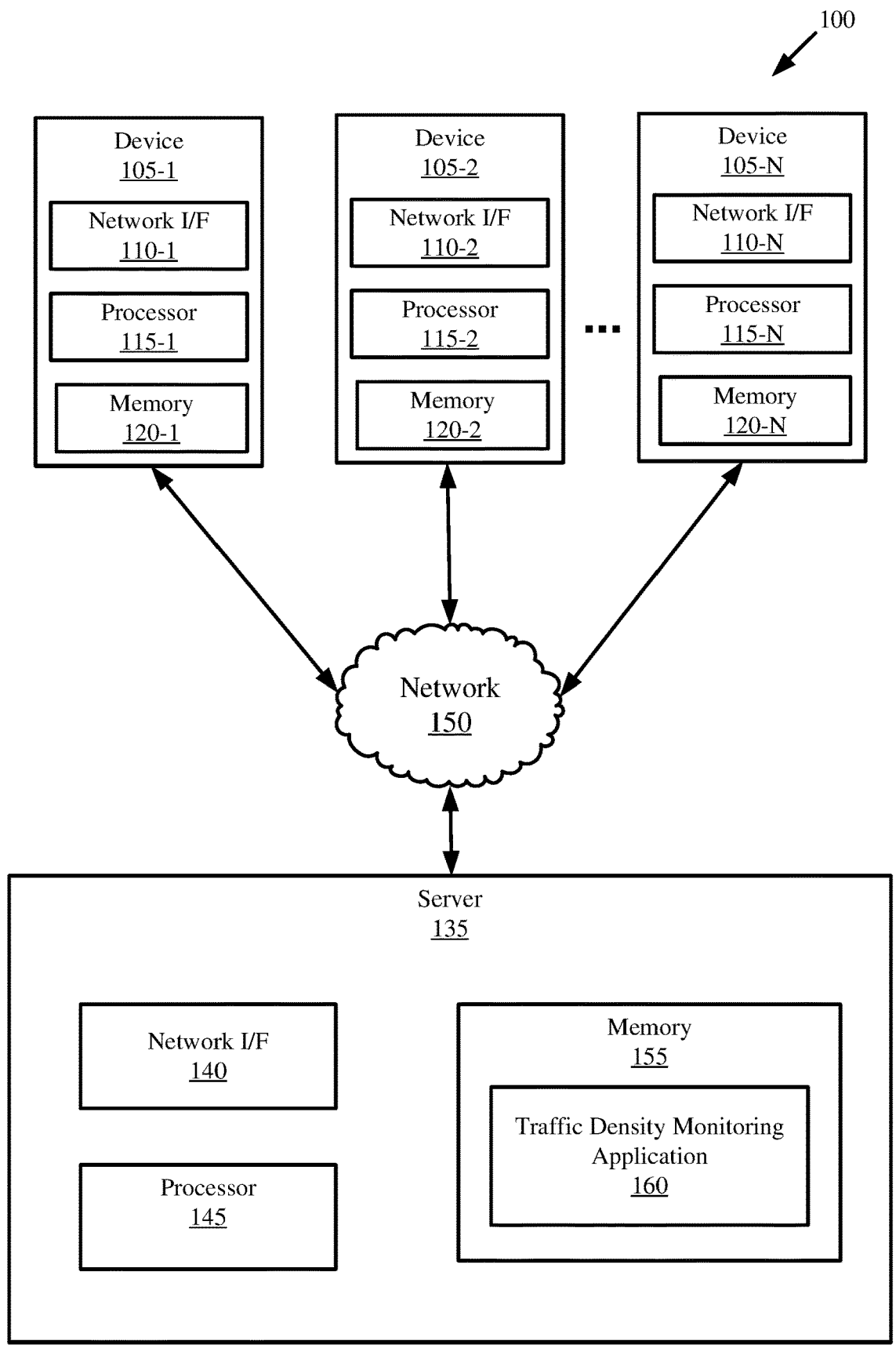
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and in particular, to wireless traffic density monitoring. While the present disclosure is not necessarily limited to such applications, various aspects of the disclosure can be appreciated through a discussion of various examples using this context.

It may be important to know the number of individuals (e.g., traffic) that pass through a given area over time. For example, knowing the amount of traffic that passes through a given area over time may be beneficial for monitoring traffic on highways (e.g., such that wait times can be projected, alternative routes can be suggested, etc.), for monitoring capacity at locations (e.g., retail stores) and events (e.g., music concerts), for ensuring social distancing guidelines are being followed (e.g., to prevent spread of viral infections), and for monitoring tours or exhibitions (e.g., to track participants in tours and densely occupied areas in museums or other attractions). Though methods exist to track individuals through, for example, global positioning systems (GPS), this information may reveal identifying information associated with individual's devices. Further, they require each device to have positioning capabilities. Alternative methods for monitoring traffic within areas in an anonymous manner are needed.

Aspects of the present disclosure relate to anonymous traffic monitoring. A lead device with positioning capabilities (e.g., global positioning system (GPS) or indoor positioning system (IPS) technology) can be initiated. The lead device can poll (e.g., exchange data with) wireless enabled devices within a wireless range. Device identification information associated with the polled wireless enabled devices can be removed. Density can be calculated within the wireless range based on the number of polled wireless enabled devices within the wireless range.

Aspects of the present disclosure allow for traffic density calculations in areas over time. Advantageously, not every device within the area for which density is accounted for is required to be located. Rather, only the location of the lead device may be necessary as nearby wireless enabled devices can be polled for by the lead device over a wireless network. Further still, anonymity can be maintained as device identifiers of devices in communication with the lead device can be erased or obfuscated.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, video camera, or other input device), and/or any commercially available or custom software (e.g., browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The server 135 includes a traffic density monitoring application 160. The traffic density monitoring application 160 can be configured to determine traffic density within areas over time. The traffic density monitoring application 160 can first be configured to establish communication with a lead device (e.g., device 105-1). The lead device can be a device that has positioning capabilities. That is, the lead device can be located (e.g., by the server 135) through means such as a global positioning systems (GPS) and wireless positioning systems (e.g., positioning via trilateration, received signal strength indication (RSSI) analysis, angle of arrival, time of arrival, etc.).

Upon connection with the lead device, the lead device can be configured to periodically poll (e.g., ping, exchange information with) for nearby wireless enabled devices within the vicinity (e.g., based on the wireless positioning range of the lead device). For example, the lead device can poll for nearby devices using methods such as short-range point-to-point communications (e.g., radio-frequency identification (RFID), EnOcean, Wireless USB, TransferJet, dedicated short-range communications (DSRC), NFC (near-field communication)), wireless sensor networks (e.g., ZIG-BEE®, personal area networks (PAN), BLUETOOTH®, ultra-wideband (UWB)), and wireless networks (e.g., wireless LAN (WLAN)). In embodiments, Bluetooth Low Energy (BLE) can be used due to its reliable connection coupled with relatively low power consumption.

Upon identifying nearby wireless enabled devices (e.g., via Bluetooth pings), identifying information associated with these devices can be deleted. That is, universally unique identifiers (UUIDs), media access control (MAC) addresses, Bluetooth Identifications (IDs) or other device identifiers which were obtained by the lead device via wireless communication can be erased thereby providing anonymity to nearby devices within the system.

Thereafter, the density within the area based on the wireless communication range of the lead device (e.g., herein referred to as "patch density") can be calculated based on the number of devices the lead device successfully communicated with. For example, the patch density can be calculated in accordance with: Patch Density (PD)=n/patch area (PA), where n is the number of devices identified within the patch area (PA) (e.g., the lead device plus any polled nearby wireless devices). As an example, if a given lead device has a BLE range of 5 m (e.g., a 5 meter radius range), and four devices were identified via a BLE ping, then the patch density would be calculated as PD=$5/\pi(5^2)$=0.064 devices/$m^2$.

In embodiments, patch density calculations can be received from multiple lead devices over time within a given area. Thus, the traffic density within various areas can be updated in real time. In some embodiments, if multiple lead devices are in the same vicinity (e.g., their wireless range overlaps), then the overlap can be considered when calculating the patch density collectively occupied by the multiple lead devices. In embodiments, one or more actions can be executed based on received patch density calculations. For example, alerts can be issued to nearby devices (e.g., warning about social distances guidelines, warning about highway traffic, warning about populated areas, etc.) based on density values (e.g., as compared to one or more thresholds).

In some embodiments, classifications can be determined for areas based on density values and ratios (e.g., density calculated at a first time divided by density calculated at a second time) calculated over time. As an example, if a calculated density value remains relatively high over time (e.g., above 0.05 devices/$m^2$), but the density ratio remains close to 1 over time (e.g., the density ratio has an average value of 1 over a period of 20 seconds), then a classification corresponding to the area can be set as "densely occupied." As another example, if a density value is relatively low over time (e.g., below 0.025 devices/$m^2$) and the density ratio changes rapidly over time, then a classification corresponding to the area can be set as "sparsely occupied." As another example, if the density value remains at a minimum value (e.g., based on the density being calculated based on the presence of the lead device only) over time, then a classification corresponding to the area can be set as "not occupied." However, it should be noted that any suitable classification can be determined and assigned to an area based on observed density values/ratios. In embodiments, notifications can be issued to nearby devices indicating the classification of the area they occupy.

Aspects of the present disclosure allow for traffic density calculations in areas over time. Advantageously, not every device within the area for which density is accounted for is required to be located. Rather, only the location of the lead device may be necessary as nearby wireless enabled devices can be polled for by the lead device over a wireless network.

Further still, anonymity can be maintained as device identifiers of devices in communication with the lead device can be erased or obfuscated.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
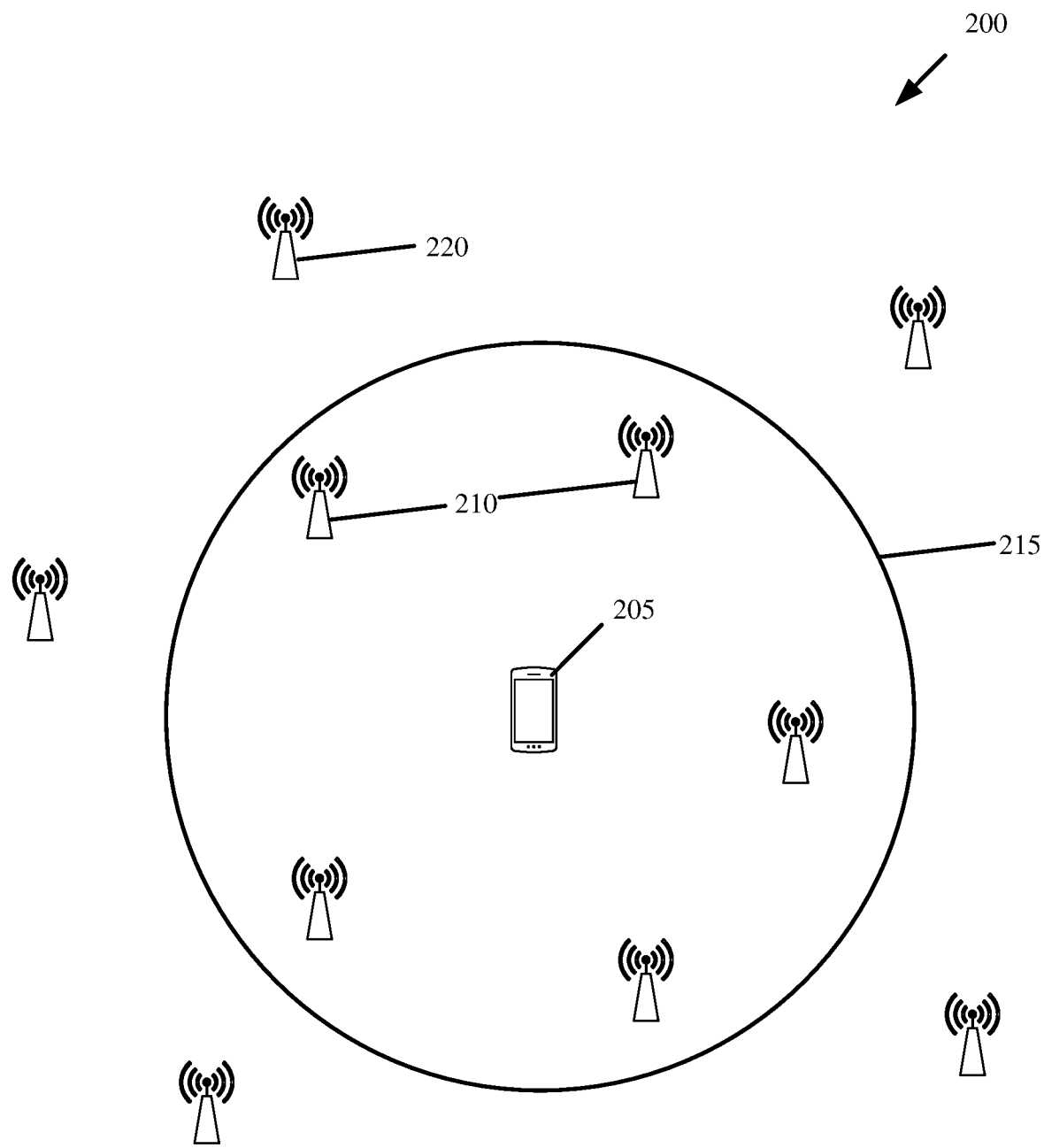
FIG. 2 is a diagram illustrating a computing environment including a lead device communicatively coupled to a set of wireless enabled devices within a wireless range, in accordance with embodiments of the present disclosure.

Referring now to FIG. 2, shown is a diagram of an example computing environment 200 including a lead device 205 communicatively coupled to a set of wireless enabled devices 210. As shown in FIG. 2, the lead device 205 has a corresponding wireless range 215. The wireless range 215 defines the area for which density around the lead device 205 can be calculated. A set of wireless enabled devices 210 are present within the wireless range 215 and a set of wireless enabled devices 220 are outside of the wireless range 215. Thus, when the patch density of the area covered by the wireless range 215 is calculated, the set of wireless enabled devices 210 are considered. In this example, if the radius of the circle defining the wireless range 215 is 10 meters, the patch density would be calculated as $PD=6/\pi(10^2)=0.019$ devices/m².

Figure 3:
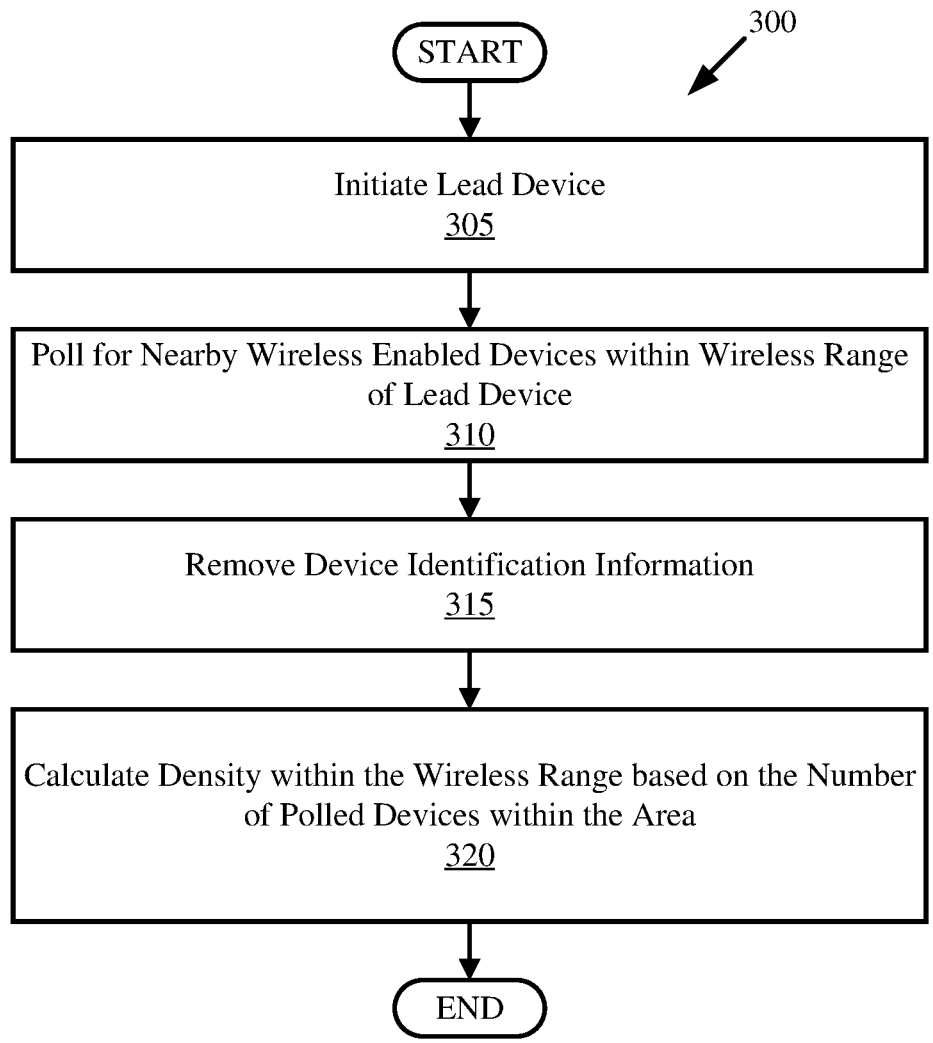
FIG. 3 is a flow-diagram illustrating an example method for calculating density within a wireless range of a lead device, in accordance with embodiments of the present disclosure.

Referring now to FIG. 3, shown is a flow-diagram illustrating an example method 300 for calculating density within a wireless range of a lead device, in accordance with embodiments of the present disclosure. One or more operations of method 300 can be completed by one or more processing circuits.

Method 300 initiates at operation 305, where a lead device is initiated. The lead device can be a device with positioning capabilities (e.g., GPS and/or indoor positioning system (IPS) technology). In embodiments, communication can be established with the lead device by a server or other device by request (e.g., to receive data regarding the number of devices in the vicinity of the lead device such that densities can be calculated).

The lead device then polls for nearby wireless enabled devices within a wireless range of the lead device. This is illustrated at operation 310. Polling for nearby wireless enabled devices by the lead device can include continuously requesting information (e.g., a response for identifying information) from nearby wireless devices over a given wireless network (e.g., Bluetooth). If a response (e.g., a nearby device transmits a UUID, MAC address, Bluetooth ID or other identifying information to the lead device) is received from a nearby wireless enable device, the device is considered to be within the wireless range of the lead device.

Thereafter, collected device identification information is removed. This is illustrated at operation 315. Removal of device identification can include erasing or obfuscating identification data received by nearby wireless enabled devices.

The density within the wireless range of the lead device is then calculated based on the number of polled devices within the wireless range. This is illustrated at operation 320. For example, the density within the wireless range can be calculated based on the formula: patch density (PD)=n/patch area (PA), where n is the number of devices within the wireless range (the lead device plus the polled nearby devices) and PA is the wireless range. The calculated density can then be displayed or transmitted to one or more devices for monitoring purposes.

In embodiments, upon calculating the density value, the density can be compared to one or more thresholds to determine whether to issues alerts. Alerts may indicate when density is below a particular value, within a particular range, or above a particular value. For example, if a calculated density falls below a threshold value, an alert can be transmitted (e.g., to an organizer device) indicating that the density value is below the threshold value. This can be used for the purpose of monitoring capacities at locations such that more individuals can be allowed to enter a given area based on the density falling below a threshold value. As another example, if a density value exceeds a threshold, an alert can be transmitted indicating that the density value exceeded the threshold value. This can be used to, for example, ensure that a given area does not include too many individuals (e.g., for social distances purposes).

In embodiments, density values can be collected from multiple lead devices over time such that densities within various areas can be monitored. In embodiments, the density values calculated for respective areas within a larger area can be depicted on a heat map (e.g., with colors corresponding to density magnitude) or other visual representation indicating the densities calculated in the various areas over time. For example, a visual map of a large area may indicate multiple densities calculated for respective circular areas encompassing respective lead devices.

The aforementioned operations can be completed in any order and are not limited to those described. Additionally, some, all, or none of the aforementioned operations can be completed, while still remaining within the spirit and scope of the present disclosure. For example, in some embodiments, operation 315 may not be completed if no device identification information is received while polling for nearby devices at operation 310.

Figure 4:
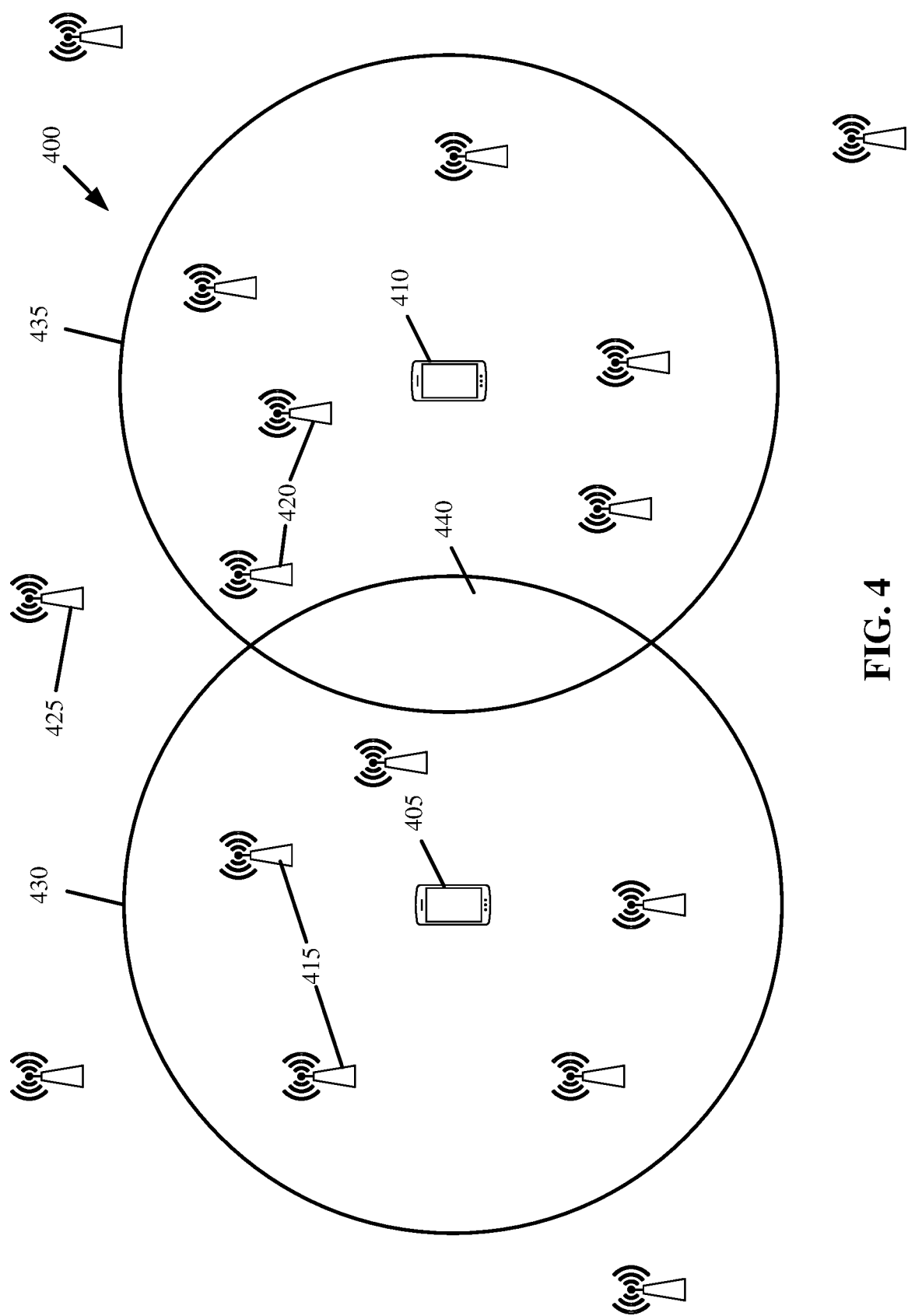
FIG. 4 is a diagram illustrating a computing environment including two lead devices coupled to two respective sets of wireless enabled devices, in accordance with embodiments of the present disclosure.

Referring now to FIG. 4, shown is a diagram of an example computing environment 400 including a first lead device 405 and a second lead device 410 communicatively coupled to a first set of wireless enabled devices 415 and a second set of wireless enabled devices 420, respectively. As shown in FIG. 4, each respective lead device 405, 410 has a wireless range 430, 435. The wireless range 430, 435 for each lead device 405, 410 dictates the patch area of which density is calculated for each lead device 405, 410. A set of devices 425 are outside of the wireless ranges 430 and 435 and thus are not considered when calculating density. Assuming each wireless range 430, 435 has a 10 m radius, the density within the first wireless range 430 is calculated as $PD=6/\pi(10^2)=0.019$ devices/m² and the density within the second wireless range 435 is calculated as $PD=7/\pi(10^2)=0.022$ devices/m².

In the example depicted in FIG. 4, the wireless range 430 of the first lead device 405 overlaps the wireless range 435 of the second lead device 410. Thus, the density within overlapping area 440 is based on the contribution of the density each respective calculated area (e.g., for each lead device). As such, the size of the overlapping area 440 can be calculated and the density of the overlapping area 440 can be calculated based on the additive densities of the first and second wireless ranges 430, 435. Thereafter, the density within the total area covering both wireless ranges 430 and 435 can be calculated.

Figure 5:
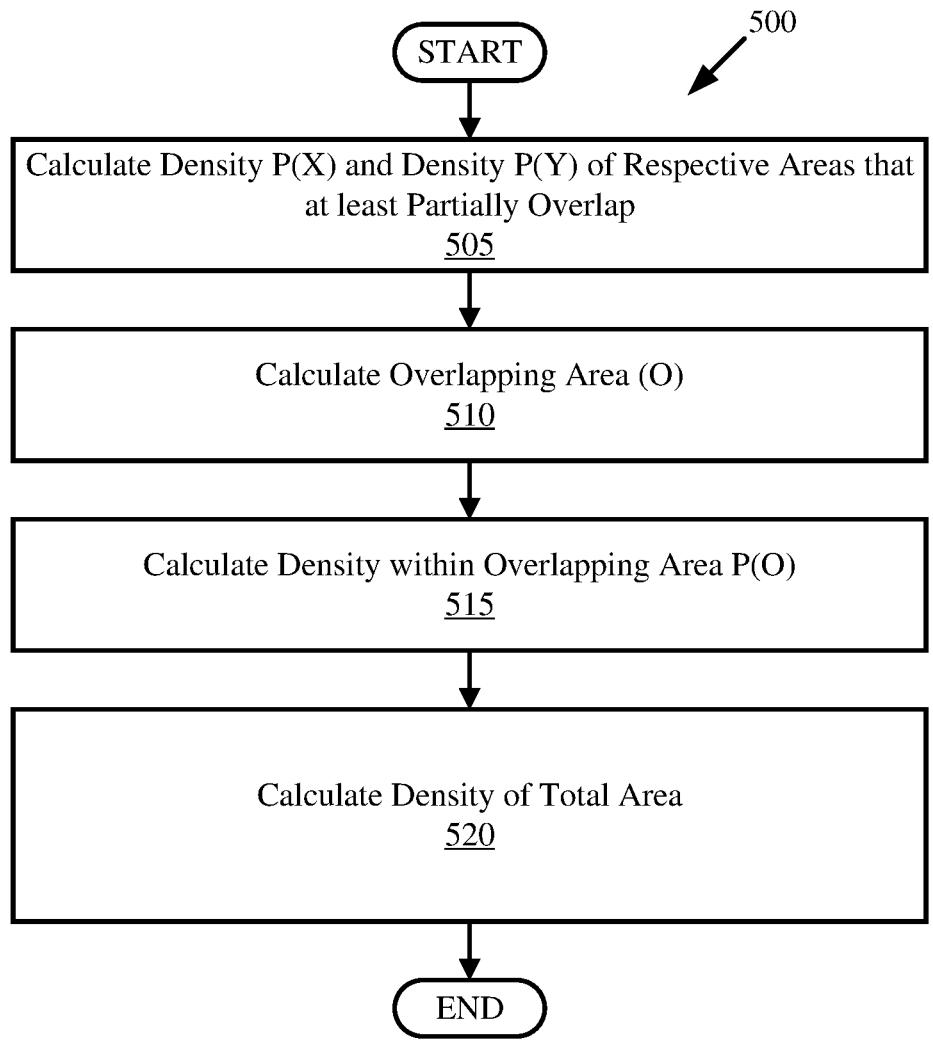
FIG. 5 is a flow-diagram illustrating an example method for calculating density within a total area covering two wireless ranges of two respective lead devices, in accordance with embodiments of the present disclosure.

Referring now to FIG. 5, shown is a flow-diagram illustrating an example method 500 for calculating density of a total area covering two wireless ranges of two respective lead devices, in accordance with embodiments of the present disclosure. One or more operations of method 500 can be completed by one or more processing circuits.

Method 500 initiates at operation 505, where density of a first area P(X) is calculated and where density of a second area P(Y) is calculated, where the first and second areas at least partially overlap. The density of each respective area can be calculated based on patch density (PD)=n/patch area (PA). As shown in the example in FIG. 4, if each wireless range 430, 435 has a radius of 10 m, the density within the first wireless range 430 is calculated as PD=$6/\pi(10^2)$=0.019 devices/m$^2$ and the density within the second wireless range 435 is calculated as PD=$7/\pi(10^2)$=0.022 devices/m$^2$.

The overlapping area (O) is then calculated. This is illustrated at operation 510. The overlapping area (O) can be calculated based on the geometric properties of each wireless range as well as the distance between each area. As shown in FIG. 4, the overlapping area (O) 440 is the area covered by the circle-circle intersection.

The density within the overlapping area (O) is then determined. This is illustrated at operation 515. In embodiments, the density within the overlapping area (O) is based on the additive densities of the first and second areas. That is, the density of the overlapping area (O) can be determined by adding P(X) and P(Y). As shown in the example in FIG. 4, the density within the overlapping area (O) can be calculated as P(X)+P(Y) or 0.019 devices/m$^2$+0.022 devices/m$^2$=0.041. devices/m$^2$.

The density of the total area covered by both wireless ranges is then calculated. This is illustrated at operation 520. In embodiments, the density within the total area covered by both wireless ranges can be calculated according to patch density (PD)=n/patch area (PA), where n is the total number of identified devices within both wireless areas and wherein PA=(patch area (X)+patch area (Y)−overlapping area (O)). Thus, according to the example depicted in FIG. 4, the total density covered by both wireless ranges is calculated as PD=$13/(2\pi(r^2)-O)$, where r is the radius of each wireless range and where 0 is the overlapping area.

The aforementioned operations can be completed in any order and are not limited to those described. Additionally, some, all, or none of the aforementioned operations can be completed, while still remaining within the spirit and scope of the present disclosure.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
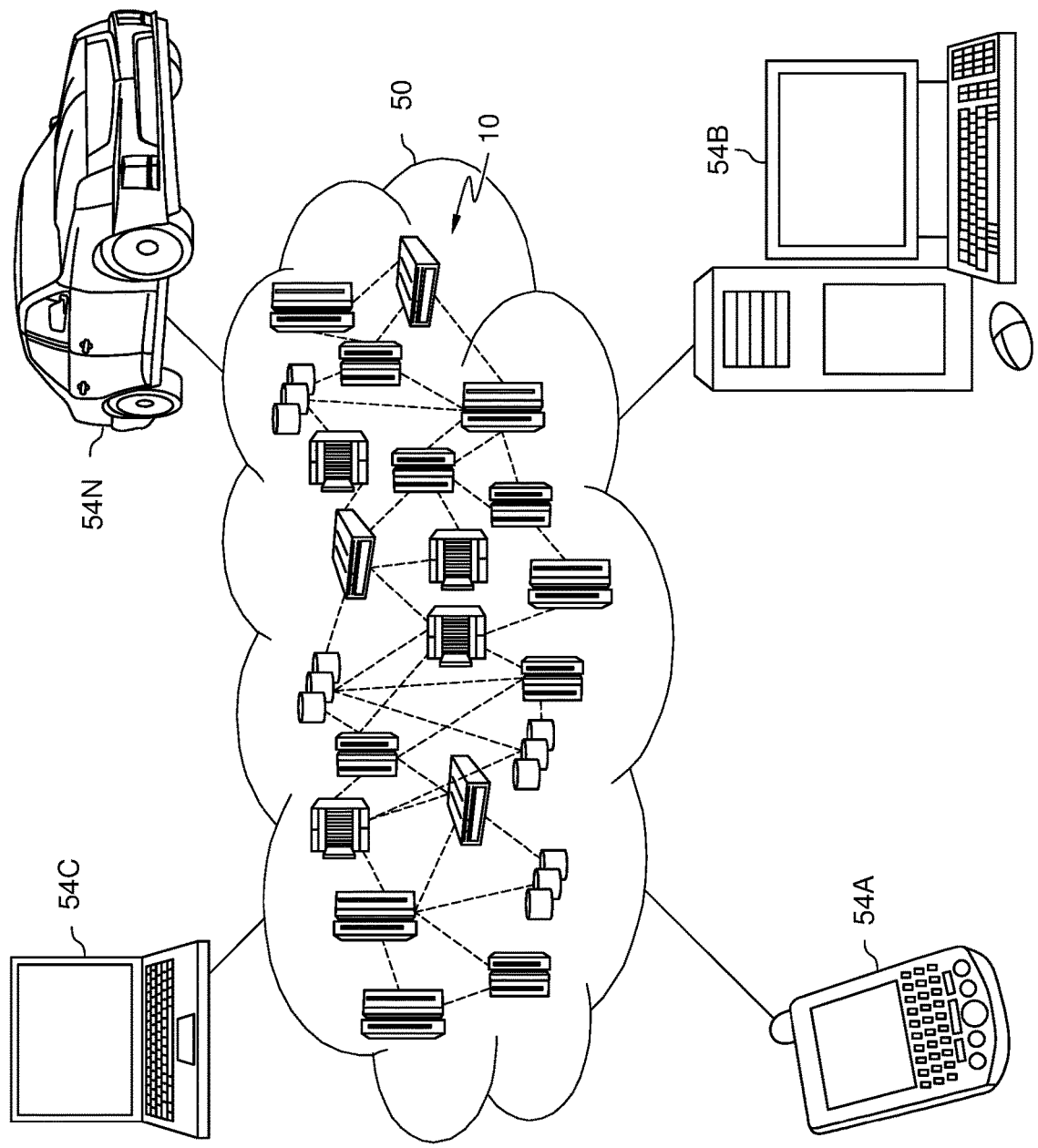
FIG. 6 is a diagram illustrating a cloud computing environment, in accordance with embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
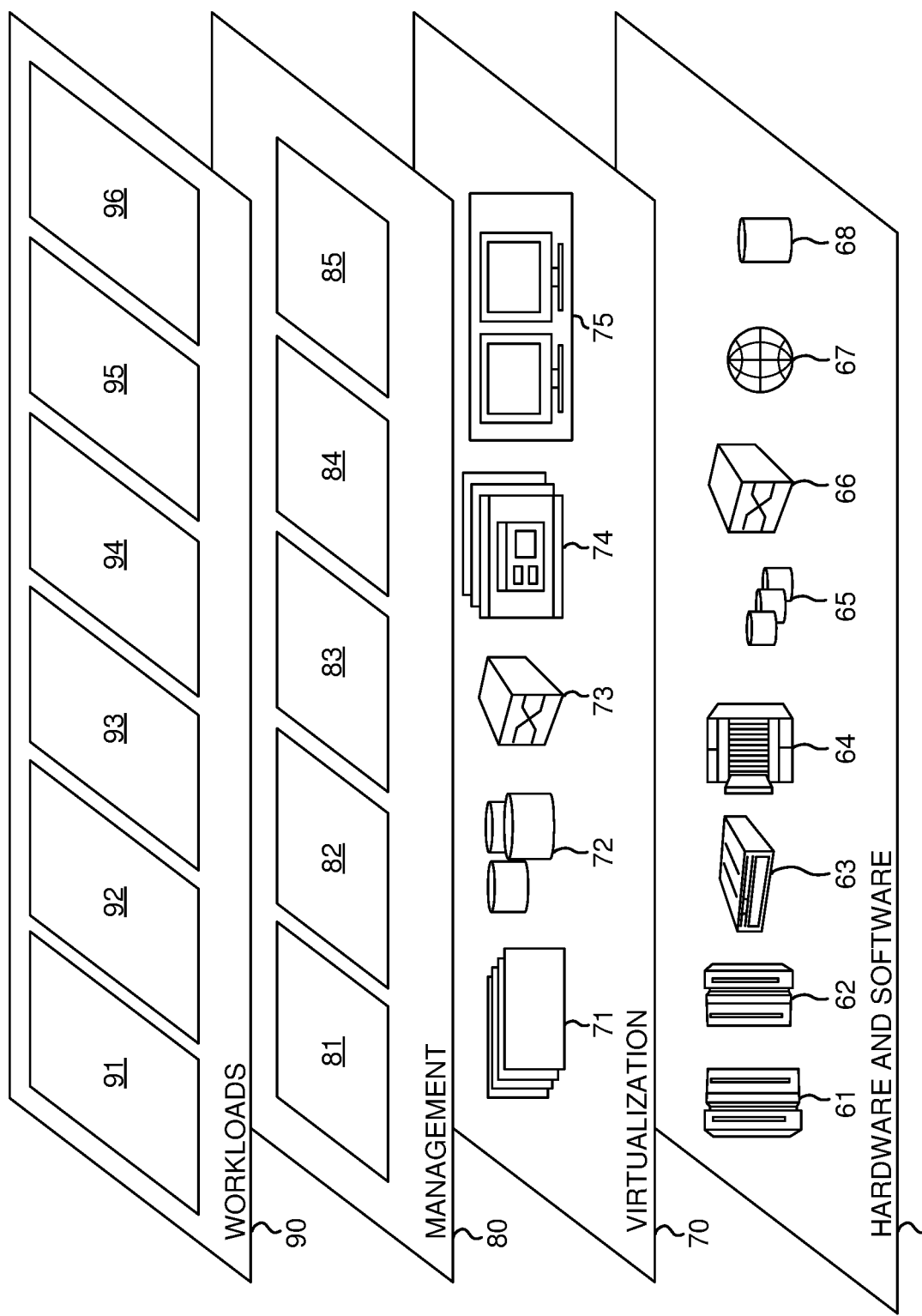
FIG. 7 is a block diagram illustrating abstraction model layers, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and traffic density monitoring 96.

Figure 8:
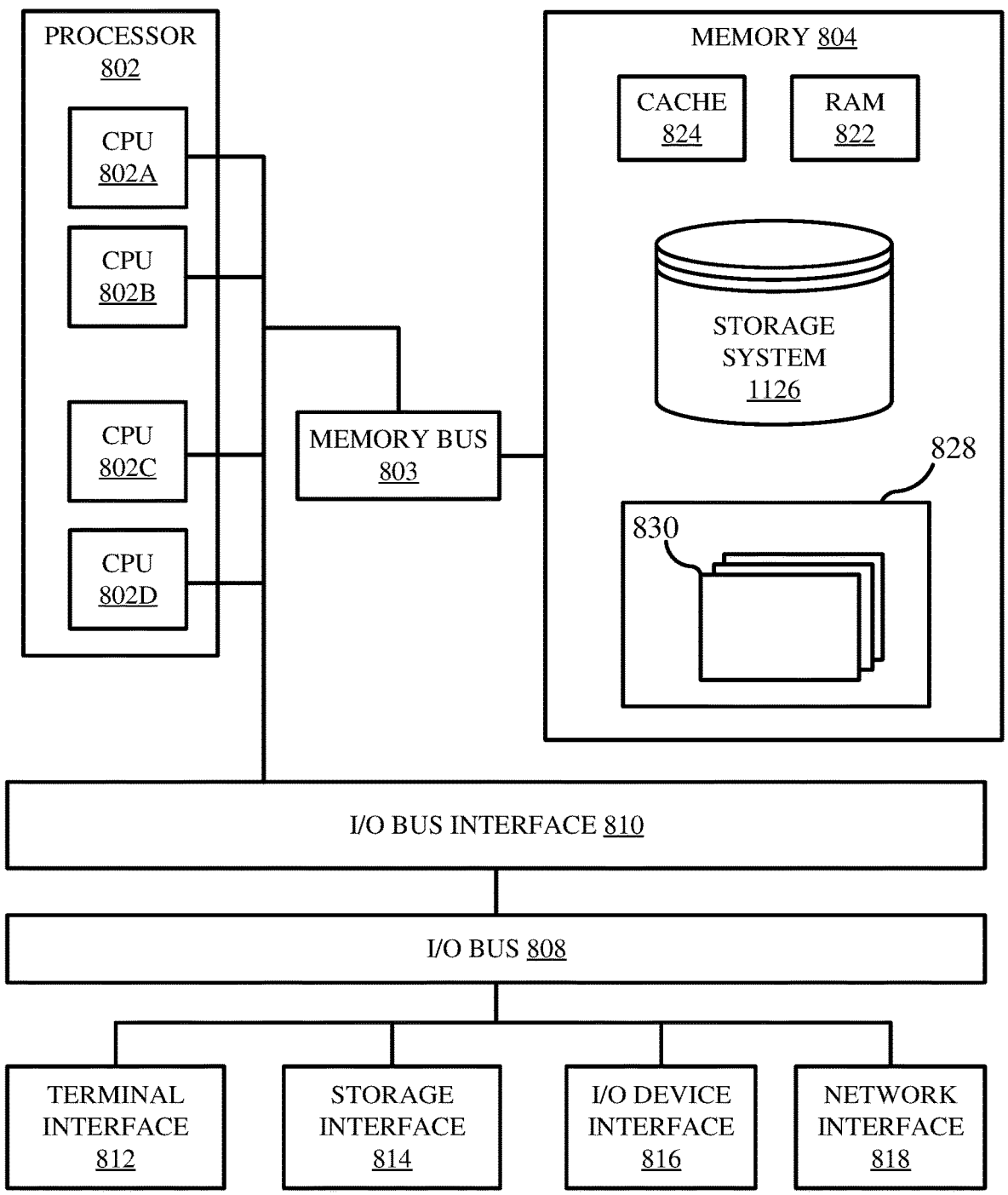
FIG. 8 is a high-level block diagram illustrating an example computer system that may be used in implementing one or more of the methods, tools, and modules, and any related functions, described herein, in accordance with embodiments of the present disclosure.

Referring now to FIG. 8, shown is a high-level block diagram of an example computer system 801 (e.g., devices 105 and server 135) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 802, a memory subsystem 804, a terminal interface 812, a storage interface 814, an I/O (Input/Output) device interface 816, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
    initiating a lead device with positioning capabilities;
    polling, by the lead device, wireless enabled devices in a wireless range of the lead device;
    removing device identification information associated with the polled wireless enabled devices; and
    calculating a density within the wireless range based on the number of polled wireless enabled devices within the wireless range.

2. The method of claim 1, further comprising:
    comparing the calculated density to a threshold; and
    issuing an alert based on the comparison.

3. The method of claim 1, further comprising:
    receiving, from a plurality of lead devices, respective density calculations corresponding to respective wireless ranges of each lead device of the plurality of lead devices; and
    generating a heat map indicating each respective density within each respective wireless range with respect to a larger area including each wireless range, wherein colors within the heat map are based on the respective density calculations.

4. The method of claim 1, further comprising:
    calculating a second density within a second wireless range based on a second number of polled wireless enabled devices within the second wireless range of a second lead device;
    determining an overlapping area between the wireless range and the second wireless range; and calculating density of a total area covering both the wireless range and the second wireless range based on a total number of polled wireless enabled devices within the total area divided by the total area, wherein the total area is the wireless range plus the second wireless range minus the overlapping area.

5. The method of claim 1, wherein the wireless enabled devices are polled using a Bluetooth Low Energy (BLE) wireless connection.

6. The method of claim 1, wherein the removed device identification information includes universally unique identifiers (UUIDs).

7. A system comprising:
one or more processors; and
one or more computer-readable storage media storing program instructions which, when executed by the one or more processors, are configured to cause the one or more processors to perform a method comprising:
initiating a lead device with positioning capabilities;
polling, by the lead device, wireless enabled devices in a wireless range of the lead device;
removing device identification information associated with the polled wireless enabled devices; and
calculating a density within the wireless range based on the number of polled wireless enabled devices within the wireless range.

8. The system of claim 7, further comprising:
comparing the calculated density to a threshold; and
issuing an alert based on the comparison.

9. The system of claim 7, further comprising:
receiving, from a plurality of lead devices, respective density calculations corresponding to respective wireless ranges of each lead device of the plurality of lead devices; and
generating a heat map indicating each respective density within each respective wireless range with respect to a larger area including each wireless range, wherein colors within the heat map are based on the respective density calculations.

10. The system of claim 7, further comprising:
calculating a second density within a second wireless range based on a second number of polled wireless enabled devices within the second wireless range of a second lead device;
determining an overlapping area between the wireless range and the second wireless range; and
calculating density of a total area covering both the wireless range and the second wireless range based on a total number of polled wireless enabled devices within the total area divided by the total area, wherein the total area is the wireless range plus the second wireless range minus the overlapping area.

11. The system of claim 7, wherein the wireless enabled devices are polled using a Bluetooth Low Energy (BLE) wireless connection.

12. The system of claim 11, wherein the removed device identification information includes a Bluetooth identification.

13. The system of claim 7, further comprising:
determining an updated density within the wireless range based on the number of polled wireless enabled devices within the wireless range at a second time;
determining a density ratio by dividing the density by the updated density; and
determining a classification for the wireless range based on the density ratio.

14. The system of claim 13, further comprising:
displaying the classification on the lead device.

15. A computer program product comprising one or more computer readable storage media, and program instructions collectively stored on the one or more computer readable storage media, the program instructions comprising instructions configured to cause one or more processors to perform a method comprising:
initiating a lead device with positioning capabilities;
polling, by the lead device, wireless enabled devices in a wireless range of the lead device;
removing device identification information associated with the polled wireless enabled devices; and
calculating a density within the wireless range based on the number of polled wireless enabled devices within the wireless range.

16. The computer program product of claim 15, further comprising:
comparing the calculated density to a threshold; and
issuing an alert based on the comparison.

17. The computer program product of claim 15, further comprising:
receiving, from a plurality of lead devices, respective density calculations corresponding to respective wireless ranges of each lead device of the plurality of lead devices; and
generating a heat map indicating each respective density within each respective wireless range with respect to a larger area including each wireless range, wherein colors within the heat map are based on the respective density calculations.

18. The computer program product of claim 15, further comprising:
calculating a second density within a second wireless range based on a second number of polled wireless enabled devices within the second wireless range of a second lead device;
determining an overlapping area between the wireless range and the second wireless range; and
calculating density of a total area covering both the wireless range and the second wireless range based on a total number of polled wireless enabled devices within the total area divided by the total area, wherein the total area is the wireless range plus the second wireless range minus the overlapping area.

19. The computer program product of claim 15, further comprising:
determining an updated density within the wireless range based on the number of polled wireless enabled devices within the wireless range at a second time;
determining a density ratio by dividing the density by the updated density; and
determining a classification for the wireless range based on the density ratio.

20. The computer program product of claim 19, further comprising:
displaying the classification on the lead device.

* * * * *